United States Patent [19]

Scarpelli

[11] 4,176,375
[45] Nov. 27, 1979

[54] APPARATUS FOR VIDEO DISPLAY OF AUDIO FREQUENCY PATTERNS

[76] Inventor: Jonathan B. Scarpelli, 11714 Montbrook, Houston, Tex. 77099

[21] Appl. No.: 920,705

[22] Filed: Jun. 30, 1978

[51] Int. Cl.² .............................................. H04N 7/18
[52] U.S. Cl. ........................................ 358/92; 358/82
[58] Field of Search ........................... 358/81, 82, 93; 179/1 SP

[56] References Cited

U.S. PATENT DOCUMENTS

| | | | |
|---|---|---|---|
| 3,723,652 | 3/1973 | Alles et al. | 358/82 |
| 3,969,972 | 7/1976 | Bryant | 358/81 |
| 4,001,880 | 1/1977 | Delikat | 358/82 |
| 4,081,829 | 3/1978 | Brown | 358/82 |

*Primary Examiner*—Richard Murray
*Attorney, Agent, or Firm*—Neal J. Mosely

[57] ABSTRACT

An apparatus is disclosed for connection to the antenna input of a television receiver. The apparatus has an audio frequency input connection and includes means to convert an audio signal into a pleasantly varying form for display as a varying pattern on the picture tube of a television receiver. The apparatus constantly samples and converts the audio signal and stores a value into an image memory which represents an instantaneous time sampled pixel (picture element) and constantly displays the contents of the image memory on the picture tube of a television receiver. The apparatus samples and converts the audio signal and stores a value into the image memory which represents a Lissajous pattern which is varied in size and shape in accordance with the audio signal.

15 Claims, 2 Drawing Figures

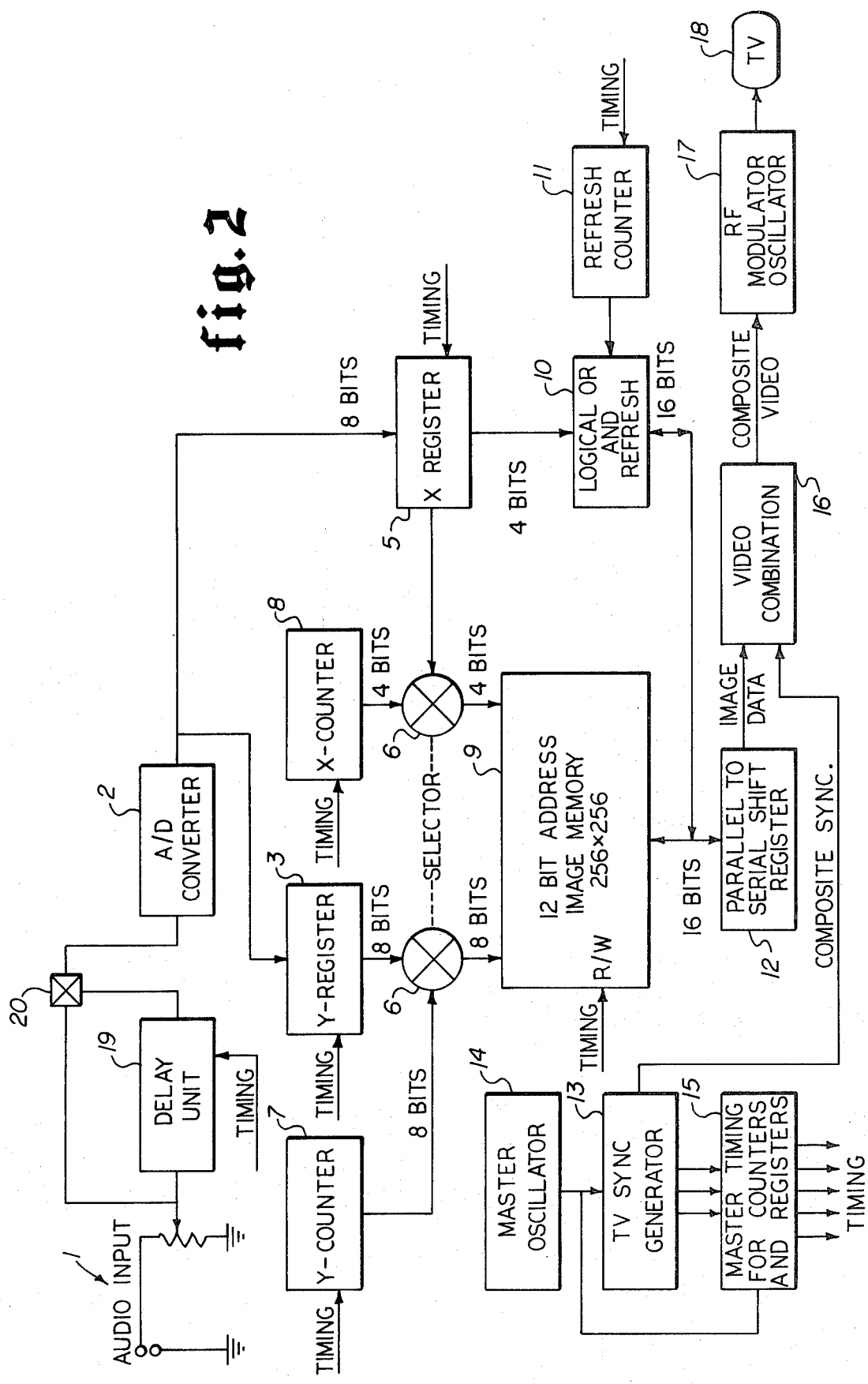

APPARATUS FOR VIDEO DISPLAY OF AUDIO FREQUENCY PATTERNS

BACKGROUND OF THE INVENTION

1. Field of the Invention

This invention relates to new and improved apparatus for displaying a pattern on the picture tube of a standard television receiver and varying the pattern in accordance with an audio frequency signal input.

2. Brief Description of the Prior Art

Systems have been devised in the past for interpreting sound, especially music, in terms of color. The development of such systems has been a natural result of a long standing recognition that sounds are peculiarly susceptible to portrayal and interpretation by the many known shades and tones of color. Thus, footlights and spotlights of various colors have been used in dramatic and musical productions for many years. Also, there are numerous instances of "sound and light" shows which have often been used to provide a background for narration of historical or travel information.

In the past, systems have been proposed for correlating light and sound in which music from any suitable source is coordinated with a bank of many colored lights. The lights have been correlated in accordance with either the frequency or amplitude characterisitcs. Such a system is shown in Patterson U.S. Pat. No. 1,977,997.

Giacoletto U.S. Pat. No. 2,804,500 discloses an apparatus wherein electric currents representing sound waves are divided into frequency bands by means of suitable filtering devices and fed into separate paths to control electrodes of separate color cathode ray tubes or the different control electrodes of a single tri-color tube for color television display.

Miura et al. U.S. Pat. No. 3,581,192 discloses an apparatus in which a sound signal is analyzed into a plurality of constituent frequency components and applied to a color display on a color picture tube of a television receiver.

Ward U.S. Pat. No. 3,603,963 discloses an apparatus for displaying a seismic format on a cathode ray tube.

In addition, a variety of types of game apparatus have been recently developed and marketed for displaying selected patterns on the picture tube of a television receiver. Game apparatus of this type includes means to control a pattern and movement of the display on the picture tube.

SUMMARY OF THE INVENTION

This invention comprises an apparatus to condition and appropriately display an audio frequency signal on a standard television receiver in such a way that a predetermined pattern is generated with the pattern effects being coherent and visually representative of the audio level and frequency content. The apparatus constantly samples and converts the audio signal and stores a value into image memory which represents an instantaneous time sampled pixel (picture element); and it constantly displays the contents of the image memory on a television receiver. The apparatus receives an audio frequency signal and converts the signal from analog to digital form. The digital output is stored separately in a Y-register and X-register. The input to the X-register is delayed by a suitable delay unit. The output from the Y-register and X-register is combined by a selector into a 12-bit address for the purpose of setting a bit in the image memory representing the sampled pixel position. The pixel information from the memory is loaded into a shift register and then combined with composite sync information by a video combination circuit. The output from this circuit is passed through a RF modulator-oscillator circuit and the output of that circuit applied to the television receiver antenna input. The television frame result on the picture tube is a line by line representation of the contents of the image memory.

BRIEF DESCRIPTION OF THE DRAWINGS

FIG. 2 is a schematic view of another embodiment of the invention, similar to that shown in FIG. 1, in which the time delay in the relationship of the X- and Y-signal components is carried out prior to introduction of the signal to the analog/digital converter.

DESCRIPTION OF THE PREFERRED EMBODIMENTS

Figure 1:
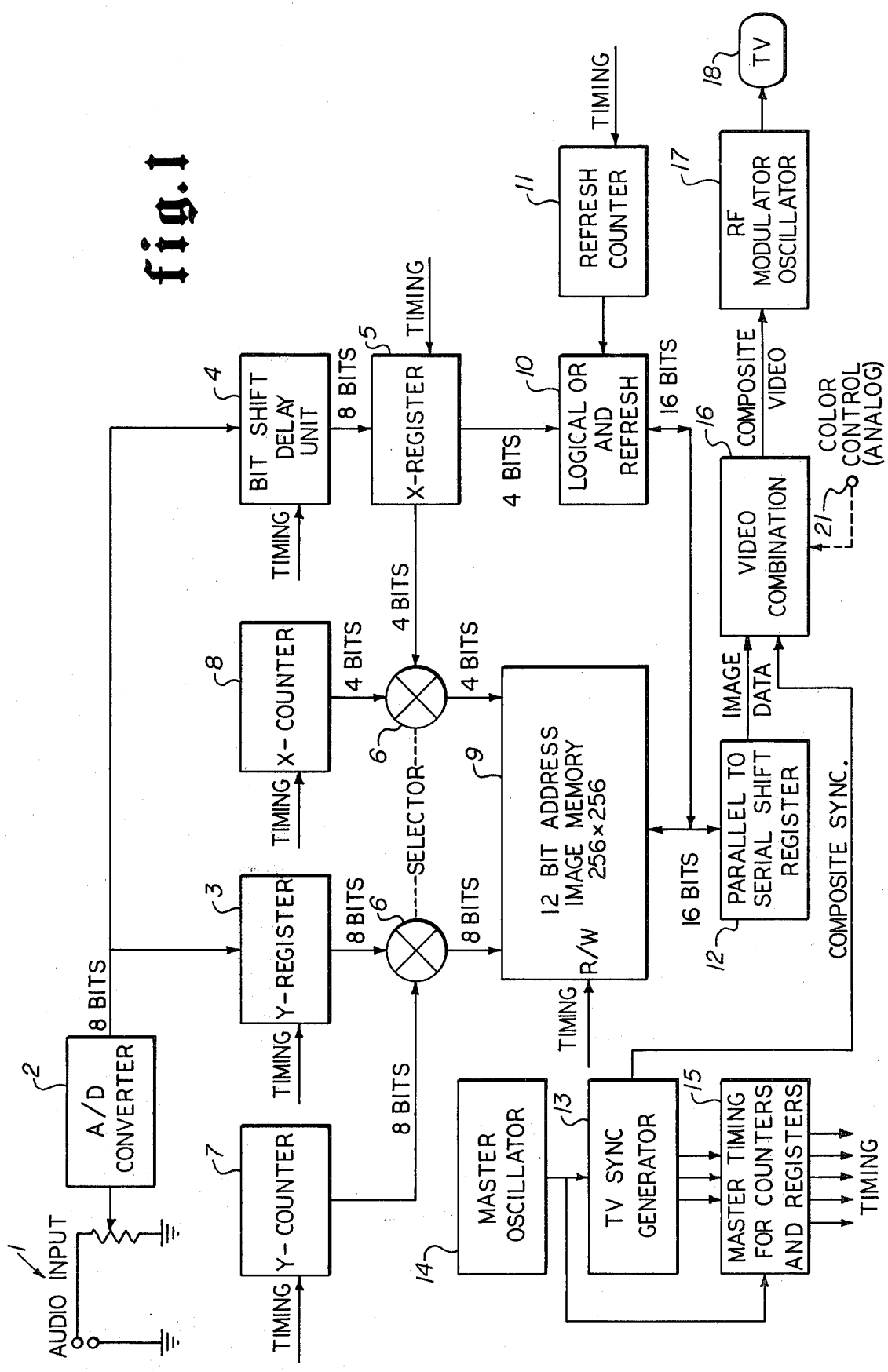
FIG. 1 is a schematic view of a preferred embodiment of this invention which illustrates the apparatus for converting an audio frequency signal to a desired pattern on the picture tube of a television receiver.

Referring to FIG. 1, there is shown a schematic diagram of a preferred embodiment of this invention in which an apparatus is provided for displaying an audio frequency signal on a standard television receiver in such a way that a selected pattern representation is generated with the pattern effects being coherent and visually representative of the audio level and frequency content. The drawing is schematic and the various components will be described and their operating relationship to each other in the apparatus. Particular, commercially available, components will be described which can be used in this apparatus, with the understanding that equivalent components can be selected for use in the apparatus as needed.

The apparatus is provided with an audio intput portion 1 which receives an audio signal from any suitable source, such as live music received through an audio receiver or the audio output from a radio, record player, tape or cassette player or the like. The audio signal is in analog form and must be converted to digital form for purposes of this invention. The audio input portion 1 is connected to an analog to digital converter 2. The connection from the audio input 1 to the A/D converter 2 preferably includes a sample/hold amplifier. A MN 344 sample/hold amplifier (manufactured by Micro Networks Corp.) is suitable for this purpose. The A/D converter 2 is preferably a Micro Networks MN 5121 8-bit converter.

The output side of the A/D converter 2 is connected to Y-register 3 and bit shift delay unit 4. Y-register 3 is preferably a Texas Instruments 74LS 174 (or SN 74 174) unit capable of 8-bit storage. Delay unit 4 is preferably a Fairchild 3342 Quad 64-bit static shift register. This device is a monolithic integrated circuit utilizing a P-channel enhancement mode silicon gate MOS technology. An on-chip clock generator provides internal clock phases from a single external clock. On-chip input resistors on all inputs allow direct bipolar compatibility. The output buffers are capable of driving low level MOS and bipolar loads directly without the addition of external components. This device is a single phase static shift register. Data is accepted at the inputs after the positive transition of the external clock. Data is available at the outputs after the negative clock transition.

All inputs are connected by an MOS transistor to $V_{SS}$ allowing complete TTL compatibility.

Delay unit 4 is connected to X-register 5 which is connected to one side of selector 6. X-register 5 is preferably a Texas Instruments 74LS 174 (SN 74 174) unit. Y-register 3 is similarly connected to the other side of slector 6. Selector 6 is preferably a Texas Instruments' 74 LS 157 (or SN 74 S157) unit. This unit is a quadruple 2-line-to-1-line data selector/multiplexer with 3-state output.

A Y-counter 7 and X-counter 8 are connected to selector 6, as indicated. These counters 7 and 8 are preferably a Texas Instruments' 74LS 163 (or SN 74 163) counter. These are synchronous, presetable counters featuring an internal carry look-ahead for application in high speed counting schemes. The counters are 4-bit binary counters. Synchronous operation is provided by having all flip-flops clocked simultaneously so that the outputs change coincident with each other when so instructed by the count-enable inputs and internal gating. This mode of operation eliminates the output counting spikes which are normally associated with asynchronous counters. A buffered clock input triggers the four J-K mast-slave flip-flops on the rising edge of the clock input waveform.

The two outputs of selector 6 are connected to image memory 9. The image memory 9 is preferably an Intel 2114, 1024X 4-static Random Access Memory unit. The Intel 2114 unit is a 4096-bit static Random Access Memory organized as 1024 words by 4-bits using N-channel silicon-gate MOS technology. This memory unit is subjected to R/W (Read/Write) timing.

X-register 5 is connected to logical OR and refresh unit 10, as indicated. Refresh counter 11 is connected to unit 10 as indicated. Unit 10 preferably consists of a Texas Instruments' 74LS 138 decoder and Texas Instruments' 74 LS 175 storage register. Counter 11 is preferably a Texas Instruments' 74 LS 163 unit of the type used as the X-counter or Y-counter.

The input/output side of unit 10 image memory 9 are connected as indicated to a parallel to serial shift register 12. This register is preferably a Texas Instruments' 74 LS 166 (or SN 74166) is shift register. This unit is an 8-bit shift register connected for parallel-in to serial-out operation.

Display timing for the apparatus is provided by a commerically available television sync generator logic circuit 13 which is operated by master oscillator 14 and is connected to master timing unit 15 which is also operated by master oscillator 14. Master timing unit 15 provides timing for the Y-counter 7, X-counter 8, refresh counter 11 and Y-register 3, X-register 5, and bit shift delay unit 4, and image memory unit 9. TV sync 13 is preferably a MM 5320 TV camera sync gnerator. This sync generator is an MOS, P-channel enhancement mode, integrated circuit designed to supply the basic sync functions for either color or monochrome 525 line/60 Hz interlaced camera and video recorder applications.

TV sync generator 13 is connected to a conventional video combination circuit 16 which is also connected to the output side of shift register 12. Video combination circuit 16 provides a composite video signal at the output side. Video combination circuit 16 is connected to RF modulator-oscillator 17 which is in turn connected to the antenna input connections for a standard TV receiver 18. The RF modulator-oscillator 17 is preferably an LM 1889 video modulator. This unit is designed to interface audio, color difference, and luminance signals to the antenna terminals of a TV receiver. It consists of a sound sub-carrier oscillator, chroma sub-carrier oscillator, quadrature chroma modulators, and RF oscillators and modulators for two low-VHF channels. This unit allows video information from VTR's, games, test equipment, or similar sources to be displayed on black and white or color TV receivers. An optional feature includes a color control (analog) 21 input to video combination circuit 16 to allow continuous color control of the displayed pattern. This control may be selectable or the input audio analog signal itself.

OPERATION

The purpose of this apparatus is to condition and appropriately display an audio frequency signal on a standard television receiver in such a way that Lissajous pattern representation is generated, with the patterns effects being coherent and visually representative of the audio level and frequency content.

The apparatus performs two basic functions. It constantly samples and converts a signal and stores a value into image memory which represents an instantaneous Lissajous time sampled pixel (picture element); and it constantaly displays the contents of the image memory on the television receiver.

The image memory 9 is used to store a television picture frame which is organized as 256 lines of 256 pixel elements per line. The Y-counter 7 is used to represent the current image raster line to be displayed, while the X-counter 8 represents the current pixel elements of the line. The image memory is organized as 256 lines with 16 line segments of 16 pixels each. The 8-bit Y-counter 7 is used to address the line to be displayed, while four most significant bits of X-counter 8 are used to address the sixteen segments of the line. The output of the memory 9 is sixteen bits of pixel information for each line segment.

Display timing is generated by sync generator logic circuit 13. The pixel information displayed is loaded into shift register 12 and shifted out to be logical OR'ed with the composite sync information by the video combination circuit 16. The composite sync is necessary to synchronize the television receiver 18. The image data from shift register 12 becomes the picture information video signal. The composite video is applied as the modulation signal to an RF modulator-oscillator circuit 17. The modulated RF output is applied to the antenna of television receiver 18. The television frame result is therefore a line by line representation of the contents of the image memory.

Lissajous images are circular and ellipsoidal patterns which have both amplitude and phase components and can be represented by (Asin $\phi$+j B sin $\alpha$), where Asin $\phi$ represents a periodically varying real component in the X or longitudinal plane of the image, and jB sin $\alpha$ represents the imaginary component in the Y or vertical axis. The amplitude and phase differences cause a pulsating swirling and spiralling effect when displayed in real time.

Lissajous images are created in this apparatus by the periodic sampling of the audio signal each 10 microseconds by the analog to digital converter 2. The sampled digital result (8-bits) is stored in Y-register 3 and the delay unit 4. This process repeats every 10 microseconds. The Y-register represents the imaginary component. The output of the delay unit 4 represents the phase different real component of a Lissajous pattern to be displayed. Thus, the Y-register 3 is used to address the vertical line address and the X-register 5 (the ouput from delay unit 4) represents the longitudinal axis pixel position.

In order to store this complex pixel dot into memory, it must be logical OR'ed with the current line segment contents. This is accomplished by first reading the appropriate line segment, logical OR'ing the segment with the pixel, and restoring the segment—all using the circuit 10. Appropriate control and timing allows this image-write to memory to occur when the memory is not being concurrently accessed for display purposes. The contents of the image memory are cleared periodically to provide the necessary refresh update rate for visual effects (using refresh counter 11).

The delay in feeding the information comprising the X component of the audio signal to the image memory 9 alters the relationship of the X and Y components to produce the Lissajous images on read-out from image memory 9 to the picture tube of TV. Lissajous images appear on the picture tube of television receiver 18 as plurality of bright dots in the form of a substantially continuous line or plurality of lines which have a pulsating swirling and spiralling effect which varies according to the audio signal.

ANOTHER EMBODIMENT

In FIG. 2, there is shown another embodiment of the invention in which time delay between the X and Y components of the audio signal is effected at the audio signal input to the A/D converter. The apparatus is provided with an audio input portion 1 which receives an audio signal from any suitable source, such as live music received through an audio receiver or the audio output from a radio, record player, tape or cassette player or the like. The audio signal is in analog form and must be converted to digital form for purposes of this invention. The audio input portion 1 is connected to analog delay unit 19 which is preferably an analog CCD delay line. Switch 20 is a MOS semi-conductor analog switch which samples alternately from the inlet and outlet sides of delay unit 9. Switch 20 is connected to an analog to digital converter 2. The connection from the switch 20 to the A/D converter 2 preferably includes a sample/hold amplifier. A MN 344 sample/hold amplifier (manufactured by Micro Networks Corp.) is suitable for this purpose. The A/D converter 2 is preferably a Micro Networks MN 5121 8-bit converter.

The output side of the A/D converter 2 is connected to Y-register 3 and X-register 5. Y-register 3 is preferably a Texas Instruments' 74LS 174 (or SN 74 174) unit capable of 8-bit storage. X-register 5 is preferably a Texas Instruments' 74LS 174 (SN 74 174) unit. X-register 5 and Y-register 3 are connected to selector 6. Selector 6 is preferably a Texas Instruments' 74 LS 157 (or SN 74 S157) unit. This unit is a quadruple 2-line-to-1-line data selector/multiplexer with 3-state output.

A Y-counter 7 and X-counter 8 are connected to selector 6, as indicated. These counters 7 and 8 are preferably a Texas Instruments' 74LS 163 (or SN 74 163) counter. These are synchronous, presetable counters featuring an internal carry look-ahead for application in high speed counting schemes. The counters are 4-bit binary counters. Synchronous operation is provided by having all flip-flops clocked simultaneously so that the outputs change coincident with each other when so instructed by the count-enable inputs and internal gating. This mode of operation eliminates the output counting spikes which are normally associated with asynchronous counters. A buffered clock input triggers the four J-K master-slave flip-flops on the rising edge of the clock input wave-form.

The two outputs of selector 6 are connected to image memory 9. The image memory 9 is preferably an Intel 2114-3, 1024X 4-static Random Access Memory unit. The Intel 2114 unit is a 4096-bit static Random Access Memory organized as 1024 words by 4-bits using N-channel silicon-gate MOS technology. This memory unit is subjected to R/W (Read/Write) timing.

X-register 5 is connected to logical OR and refresh unit 10, as indicated. Refresh counter 11 is connected to unit 10 as indicated. Unit 10 preferably consists of a Texas Instruments' 74 LS 138 decoder and Texas Instruments' 74 LS 175 storage register. Counter 11 is preferably a Texas Instruments' 74 LS 163 unit of the type used as the X-counter or Y-counter.

The input/output side of unit 10 and the image memory 9 are connected as indicated to a parallel to serial shift register 12. This register is preferably a Texas Instruments' 74 LS 166 (or SN 74166) shift register. This unit is an 8-bit shift register connected for parallel-in to serial-out operation.

Display timing for the apparatus is provided by a commericaliy available television sync generator logic circuit 13 which is operated by master oscillator 14 and is connected to master timing unit 15 which is also operated by master oscillator 14. Master timing unit 15 provides timing for the Y-counter 7, X-counter 8, refresh counter 11 and Y-register 3, X-register 5, and bit shift delay unit 4, and image memory unit 9. TV sync 13 is preferably a MM 5320 TV camera sync generator. This sync generator is an MOS, P-channel enhancement mode, integrated circuit designed to supply the basic sync functions for either color or monochrome 525 line/60 Hz interlaced camera and video recorder applications.

TV sync generator 13 is connected to a conventional video combination circuit 16 which is also connected to the output side of shift register 12. Video combination circuit 16 provides a composite video signal at the output side. Video combination circuit 16 is connected to RF modulator-osicallator 17 which is in turn connected to the antenna input connections for a standard TV receiver 18. The RF modulator-oscillator 17 is preferably an LM 1889 TV video modulator. This unit is designed to interface audio, color difference, and luminance signals to the antenna terminals of a TV receiver. It consists of a sound sub-carrier oscillator, chroma sub-carrier oscillator, quadrature chroma modulators, and RF oscillators and modulators for two low- VHF channgels. This unit allows video information from VTR's games, test equipment, or similar sources to be displayed on black and white or color TV receivers.

OPERATION

The purpose of this apparatus is to condition and appropriately display an audio frequency signal on a standard television receiver in such a way that Lissajous pattern representation is generated, with the patterns effects being coherent and visually representative of the audio level and frequency content.

The apparatus performs two basic functions. It constantly samples and converts a signal and stores a value into image memory which represents an instantaneous Lissajous time sampleed pixel (picture element); and it constantly displays the contents of the image memory on the television receiver.

The image memory 9 is used to store a television picture frame which is organized as 256 lines of 256 pixel elements per line. The Y-counter 7 is used to represent the current image raster line to be displayed, while the X-counter 8 represents the current pixel element of the line. The image memory is organized as 256 lines with 16 line segments of 16 pixels each. The 8-bit Y-counter 7 is used to address the line to be displayed, while four most significant bits of the X-counter 8 are used to address the sixteen segments of the line. The output of the memory 9 is sixteen bits of pixel information for each line segment.

Display timing is generated by sync generator logic circuit 13. The pixel information displayed is loaded into shift register 13 and shifted out to be logical OR'ed with the composite sync information by the video combination circuit 16. The composite sync is necessary to synchronize the television receiver 18. The image data from shift register 12 becomes the picture information video signal. The composite video is applied as the modulation signal to an RF modulator-oscillator circuit 17. The modulated RF output is applied to the antenna of television reciver 18. The television frame result is therefore a line by line representation of the content of the image memory.

Lissajous images are circular and ellipsodal patterns which have both amplitude and phase components and can be represented by (Asin $\phi$ +j B sin $\alpha$), where A sin $\phi$ represents a periodically varying real component in the X or longitudinal plane of the image, and j B sin $\alpha$ represents the imaginary component in the Y or vertical axis. The amplitude and phase differences cause a pulsating swirling and spirally effect when displayed in real time.

Lissajous images are created in this apparatus by the periodic sampling of the audio singal each 10 microseconds by the analog to digital converter 2. The sampled digital result (8-bits) is stored in Y-register 3 and the X-register 5. This process repeats every 10 microseconds. The Y-register represents the imaginary component. The output of the X-register 5 represents the phase different real component or a Lissajous pattern to be displayed. Thus the Y-register 3 is used to address the vertical line address and X-register 5 represents the longitudinal axis pixel position.

In order to store this complex pixel dot into memory, it must be logical OR'ed with the current line segment contents. This is accomplished by first reading the appropriate line segment, logical OR'ing the segment with the pixel, and restoring the segment—all using the circuit 10. Appropriate control and timing allows this image-write to memory to occur when the memory is not being concurrently accessed for display purposes. The contents of the image memory are cleared periodically to provide the necessary refresh update rate for visual effects (using refresh counter 11).

The delay, effected by delay unit 19, in feeding the information comprising the X component of the audio signal to the A/D converter 2 alters the relationship of the X and Y components stored in image memory 9 to produce the Lissajous images on read-out from image memory 9 to the picture tube of TV. Lissajous images appear on the picture tube of television receiver 18 as plurality of bright dots in the form of a substantially continuous line or plurality of lines which have a pulsating swirling and spiralling effect which varies according to the audio signal.

I claim:

1. Apparatus for connection to the antenna input connections to a television receiver comprising, input connections adapted for construction to an audio signal to receive said signal in analog form, output connections adapted for connection to the antenna input connections to a television receiver, means to convert an input signal from analog to digital form, circuit means to supply the digital form signal to said output connections for display on a video tube, and circuit means to vary the relationship of the x- and y-components of the signal received through said input connections whereby said digital form signal supplied to said output connections will produce on a video tube a pattern of predetermined form varying in size and shape in accordance with the audio input signal.

2. Apparatus according to claim 1 in which said last named circuit means varies the relationship of said x- and y-components prior to conversion of the signal from analog to digital form.

3. Apparatus according to claim 1 in which said last named circuit means varies the relationship of said x- and y-components subsequent to conversion of the signal from analog to digital form.

4. Apparatus according to claim 1 including memory means receiving said digital form signal and circuit means connecting said memory means to said output connections, said second named circuit means varying the relationship of the x- and y-components of the audio signal as supplied in digital form to said memory means.

5. Apparatus according to claim 4 including a parallel to serial shift register connected between the output side of said memory means and said output connections.

6. Apparatus according to claim 1 including an analog to digital converter connected to said input connections, an x-register and a y-register connected to receive the output from said converter, a selector switch connected to receive and combine the output from said x- and y-registers, memory means connected to receive the output from said selector switch to store said x- and y-components, said last named circuit means including delay means to delay the x-component relative to said y-component, a shift register connected to receive the output from said memory means to convert the signal from parallel to serial form, and said shift register being operatively connected to said output connection to supply the audio-modified signal thereto.

7. Apparatus according to claim 6 in which said delay means comprises a bit shift delay unit positioned between said converter and said x-register to delay the x-component supplied to said x-register relative to the y-component supplied to said y-register.

8. Apparatus according to claim 6 in which said delay means comprises an analog delay line and an analog switch connected to sample the input and output of said delay line, said analog switch being connected to the input side of said means to convert the signal from analog to digital form.

9. Apparatus according to claim 6 including a TV sync generator, and means to combine the output from said sync generator with the output from said shift register to produce a composite video signal.

10. Apparatus according to claim 1 comprising an analog to digital converter having an input side operatively connected to said input connections,
a bit shift delay unit connected to the output side of said converter,
an x-register connected to the output side of said delay unit,
an x-counter
a y-register connected to the output side of said converter,
a selector having input connections on one side connected to said y-counter and said y-register and input connections on another side connected to said x-counter and said x-register,
an address image memory having input connections connected to output connections on said one side and said other side of said selector,
a parallel to serial shift register having an input side connected to an output side of said address image memory,
a logical OR and refresh unit connected on one side to the output side of said x-register and on another side to the output from said adress image memory,
a refresh counter connected to said logical OR and refresh unit,
a master oscillator,
a TV sync generator,
a master timing unit,
said master oscillator being connected to said sync generator and said master timing unit,
said master timing unit being connected to said registers and said counters,
a video combination unit having input connections connected to the output of said sync generator and said shift register and operable to produce a composite video signal, and
a RF modulator-oscillator having input connections connected to said video combination unit to receive said composite video signal and output connections comprising the output connections of said apparatus.

11. Apparatus according to claim 1 comprising
an analog delay unit connected to said input connections,
an analog switch connected to sample alternately from the input and output sides of said delay unit,
an analog to digital converter having an input side connected to the output side of said analog switch,
an x-register connected to the output side of said converter,
an x-counter,
a y-register connected to the output side of said converter,
a y-counter
an address image memory having input connections connected to output connections on said one side and said other side of said selector,
a parallel to serial shift register having an input side connected to an output side of said address image memory,
a logical OR and refresh unit connected on one side to the output side of said x-register and on another side to the output from said address image memory,
a refresh counter connected to said logical OR and refresh unit,
a master oscillator,
a TV sync generator,
a master timing unit,
said master oscillator being connected to said sync generator and said master timing unit,
said master timing unit being connected to said registers and said counters,
a video combination unit having input connections connected to the output of said sync generator and said shift register and operable to produce a composite video signal, and
a RF modulator-oscillator having input connections connected to said video combination unit to receive said composite video signal and output connections comprising the output connections of said apparatus.

12. A method of producing a pattern on a video tube which varies in size and shape in accordance with an audio input signal which comprises
providing an audio input signal in analog form,
converting said signal from analog to digital form,
delaying an x-component relative to a y-component in said signal, and
supplying said digital-form signal with altered relationship of said x- and y-components to a video tube to produce the desired pattern thereon.

13. A method according to claim 12 in which the delay of said x-component relative to said y-component is effected prior to conversion of said signal from analog to digital form.

14. A method according to claim 12 in which the delay of said x-component relative to said y-component is effected subsequent to conversion of said signal from analog to digital form.

15. A method according to claim 12 in which said digital form signal is stored in a memory, removed from memory, and shifted from parallel to serial form prior to supplying said signal to said video tube.

* * * * *